United States Patent
Baumann et al.

(10) Patent No.: US 8,174,152 B2
(45) Date of Patent: May 8, 2012

(54) ASSEMBLY FOR SUPPLYING A CONSUMER WITH ELECTRIC POWER

(75) Inventors: Urs Baumann, Aarwangen (CH); John Talbot Boys, Takapuna (NZ); Grant Anthony Covic, Auckland (NZ)

(73) Assignees: Lantal Textiles, Langenthal (CH); Auckland Uniservices Limited, Auckland (NZ)

( * ) Notice: Subject to any disclaimer, the term of this patent is extended or adjusted under 35 U.S.C. 154(b) by 947 days.

(21) Appl. No.: 12/084,108

(22) PCT Filed: Oct. 27, 2006

(86) PCT No.: PCT/CH2006/000600
§ 371 (c)(1),
(2), (4) Date: Aug. 4, 2008

(87) PCT Pub. No.: WO2007/048268
PCT Pub. Date: May 3, 2007

(65) Prior Publication Data
US 2009/0289505 A1    Nov. 26, 2009

(30) Foreign Application Priority Data

Oct. 28, 2005 (EP) .................................. 05405611

(51) Int. Cl.
*H01F 38/00* (2006.01)
(52) U.S. Cl. .................................................. 307/104
(58) Field of Classification Search .................. 307/104
See application file for complete search history.

(56) References Cited

U.S. PATENT DOCUMENTS 7,635,053 B2 * 12/2009 Kozsar ........................... 191/10

FOREIGN PATENT DOCUMENTS

| GB | 541169 A | 11/1941 |
| JP | 54-111693 A | 9/1979 |
| JP | 06-231871 A | 8/1994 |
| JP | 08-035147 A | 2/1996 |
| JP | 08-144153 A | 6/1996 |
| JP | 10-005104 A | 1/1998 |
| WO | WO-96/02970 A1 | 2/1996 |
| WO | WO-2004/009399 A1 | 1/2004 |
| WO | WO-2004/009400 A1 | 1/2004 |

* cited by examiner

Primary Examiner — Rexford N Barnie
Assistant Examiner — Dru Parries
(74) Attorney, Agent, or Firm — Birch, Stewart, Kolasch & Birch, LLP (57) ABSTRACT

An arrangement for supplying a load with electrical energy from a power source comprises a textile, woven floor covering (101) with longitudinally running warp threads and transversely running weft threads, three or more current conductors (106) that are spaced apart and substantially parallel to one another being woven in either as warp threads or as weft threads, the current conductors replacing part of a filling warp, a binding warp or the weft threads during the weaving operation. The arrangement also comprises a feed for the connection of the current conductors (106) to the power source and a coupling device (130) for picking up electrical energy from the current conductors (106) in the floor covering (101) and transporting it further to the load when the coupling device (130) is brought into a power pick-up area of the floor covering (101). The coupling device (130) is formed in particular in such a way that electrical energy can be inductively picked up from the current conductors (106) running in the floor covering. The supply arrangement allows a high degree of flexibility and can be integrated well in rooms.

23 Claims, 7 Drawing Sheets

ASSEMBLY FOR SUPPLYING A CONSUMER WITH ELECTRIC POWER

TECHNICAL FIELD

The invention relates to an arrangement for supplying a load with electrical energy of a power source and to a lighting element for such an arrangement. The invention also relates to a textile, woven carpet with longitudinally running warp threads and transversely running weft threads.

PRIOR ART

Loads are generally supplied with power by connecting a connection cable to a (mains) socket-outlet. This often creates problems: for instance, socket-outlets cannot be provided at all locations where power may be required; in the middle of a room, away from walls of the room, it is particularly difficult to provide socket-outlets—fitting them on the floor is expensive and usually not very satisfactory aesthetically, especially whenever the socket-outlets are in use. For these reasons, often quite long connection cables are necessary for supplying loads. If these cables are laid loosely over the floor, this detracts from the aesthetics of the room, and the cables may get in the way or trip people. Although the cables can occasionally be laid under a floor covering, the loads (for example standard lamps, lighting means of free-standing fittings, computers, etc.) can no longer be flexibly positioned.

Supplying power to mobile loads (for example vehicles for transporting goods and/or passengers, autonomous vacuum cleaners, etc.) with an electric drive represents a special problem. It is known to equip such units with storage batteries. To charge these batteries, the unit is periodically charged at a charging station, where a cable connection or plug-in connection is established between the vehicle and a charging socket or charging socket-outlet of the charging station. However, this solution requires that the units always return to a charging station for the charging operation and are not available during the charging operation. Moreover, cables must often be provided or carried along, in order to connect the vehicle to the charging station.

It is known to couple power loads to a supply line by means of induction. WO 96/02970 (Auckland Uniservices Limited) shows an inductively fed lamp unit with a coupling device which comprises a resonant circuit, by means of which power can be inductively picked up from two parallel long straight cables. The lamp unit may for example form a road reflector, it being possible for the long cables to be accommodated underneath the road surfacing in a corresponding channel.

However, the loads can only be supplied with power along the narrowly delimited cables. It is not possible to provide entire areas with power supply capabilities. Moreover, although the solution is well suited to roads, it is not well suited to interior spaces or other public areas.

SUMMARY OF THE INVENTION

The object of the invention is to provide an arrangement for supplying a load with electrical energy that belongs to the technical field referred to at the beginning, allows a high degree of flexibility and can be integrated well in rooms.

The solution achieving the object is defined by the features of Claim 1. According to the invention, the arrangement comprises
a) a textile, woven floor covering (carpet) with longitudinally running warp threads and transversely running weft threads, three or more current conductors that are spaced apart and substantially parallel to one another being woven in either as warp threads or as weft threads;
b) a feed for the connection of the current conductors to the power source; and
c) a coupling device for picking up electrical energy from the current conductors in the floor covering and transporting it further to the load when the coupling device is brought into a power pick-up area of the floor covering.

The solution allows a high degree of flexibility of the power supply, in that the load to be supplied can be positioned largely as desired on the two-dimensional floor covering, without adaptations to the supply arrangement (such as the laying of cables) being necessary. The floor covering continues to perform its usual tasks without impairment, i.e. it can be walked on without restriction, creates a pleasant ambience and the desired aesthetics. The power supply is virtually invisible and consequently does not detract from the interior design.

The arrangement also allows power to be supplied in a simple way in the entire area that is provided with the floor covering. This is so because the carpet is laid as usual (for example adhesively attached or fixed in place), with the only additional requirement being that the feed to the power source (for example a customary mains connection) is connected. The load can then be supplied with electrical energy by means of the coupling device as soon as the latter is brought into the power pick-up area of the floor covering. The power pick-up area is, for example, a volume above the entire floor covering area up to a certain maximum distance from the floor. In the simplest case, the coupling device is simply placed on the floor and then establishes contact with the current conductors.

The coupling device may be fitted in the same housing as the load (for example in the base of a standard lamp) or a separate coupling unit may be used, one which converts the picked-up energy in such a way that customary loads can be readily connected to the coupling unit. The coupling unit may for example have a socket-outlet at which the customary mains voltage (230 V 50 Hz) is provided.

Because the current conductors form part of the fabric of the carpet, they can be incorporated directly during the weaving of the carpet, replacing part of the filling warp, the binding warp or the weft threads during the weaving operation. This dispenses with additional method steps in production, and the carpet corresponds in its main properties as a floor covering to its equivalent without current conductors. The current conductors are also securely integrated in the fabric and are consequently largely protected from external influences.

With preference, the coupling device is formed in such a way that electrical energy can be inductively picked up from the current conductors. This obviates the need for direct (conducting) contact between the coupling device and the current conductors and the power transmission is also possible when the conducting elements of the floor covering cannot be contacted directly from the surface of the latter. The energy transmission is made possible for example by the coupling unit merely being placed on the floor covering according to the invention at any desired location. The fact that an inductive energy transmission that is adequate for most applications is technically possible in the case where power is supplied by means of parallel conductors, is described for example in the already aforementioned WO 96/02970 (Auckland Uniservices Limited).

The three or more current conductors woven into the floor covering advantageously form a first group, via which electrical energy is transmitted in a first direction, and a second group, via which electrical energy is transmitted in a second direction, opposite to the first direction, each group producing a magnetic field which determines the power pick-up area of the floor covering. The magnetic fields can be used for the inductive transmission of electrical energy. Because the inductance of the current conductors depends inter alia on their length, this must not exceed a certain value if electrical energy is to be inductively transmitted efficiently.

The first and second groups respectively comprise with preference two or more current conductors. As a result, the usable magnetic flux, and consequently the transmittable electrical power output, per group can be increased, even with a small conductor diameter.

The feed may be formed in such a way that, after connection of the current conductors to the power source, an extensive magnetic field distribution is created in the area of the connected current conductors, so that in this area an electrical power output that is required as a minimum for the load can be picked up substantially everywhere, independently of the position of the coupling device. The load or the coupling device can consequently be positioned at any desired location in the area supplied with power or even pick up electrical energy continuously during movement over the area. Precise positioning of the coupling device is not necessary, and maximum flexibility is obtained for the use of the load.

Preferably, in each case a number of current conductors of a group are electrically connected in parallel. With such an arrangement it is possible to create an inductive power transmission capability substantially in the entire area that is provided with connected current conductors.

The dividing of the parallel current conductors into a number of groups lying next to one another, each with a certain number of current conductors in which the current flows in the same direction, is advantageous with regard to the greatest possible transmittable power output. The simplest configuration that can be realized here is one in which the current flows in respectively opposite directions in neighbouring groups. That is to say, the groups of current conductors may for instance be arranged and electrically connected to one another substantially in the form of a U or W. The floor covering may be contacted on one longitudinal side.

However, magnetic effects have a strong influence on the current intensities in the individual current conductors. The current intensity is strongly dependent on whether a conductor is located in the middle of a group or at its edge, in the vicinity of the next group, in which the current flows in the opposite direction. In order to mitigate the influence of these effects, current conductors of neighbouring groups are advantageously connected individually to one another, and a sequence of the current conductors is changed over between the neighbouring groups in such a way that a distance from at least one of the current conductors to a nearest outermost current conductor of the respective group varies between a first of the neighbouring groups and a second of the neighbouring groups. The change-over is performed with preference in the edge region of the floor covering, in the course of the connection of the woven-in individual conductors of neighbouring groups.

Because the current conductors run at one time at the edge and then at another time further inward in the respective group, the location-dependent effects average out and a much more uniform distribution of the current intensities can be achieved. Skilful distribution of the current conductors to different positions within the successive groups allows the homogeneity to be optimized according to requirements.

If localized maxima are to be created, the feed is advantageously formed and arranged in such a way that the three or more current conductors form a first group, via which electrical energy is transmitted in a first direction, and a second group, via which electrical energy is transmitted in a second direction, opposite to the first direction, neighbouring current conductors respectively belonging alternately to the first group and the second group. Consequently, directions of current in neighbouring parallel current conductors are respectively opposed. On account of the opposite directions of current of neighbouring conductors, the magnetic fields produced substantially cancel one another out already after a small distance, and only a very small magnetic field is produced above the carpet. Simple conductor topologies that only have to be contacted on one side can be used. For example, two neighbouring conductors are respectively connected to one another in a conducting manner at one edge of the floor covering, at which the current conductors end, while the feeding takes place at the opposite edge.

Depending on the intended application, the feed may also be formed in such a way that, after connection of the current conductors to the power source, a magnetic field distribution with at least one localized maximum is created in the area of the connected current conductors, while the magnetic field is small in the remaining regions of this area. This variant is advantageous whenever the electrical energy is required at a predetermined location and smallest possible magnetic fields are to be built up in the remaining area. If, for example, the arrangement according to the invention is used for supplying fixedly positioned light sources or other loads in the interior of an aircraft, it is desirable if the intensity of the magnetic fields can be limited as much as possible in areas of the interior in which no electrical energy is to be drawn. Otherwise, there is the risk of eddy currents being induced in metallic objects (for example in articles left on the floor, etc.) and leading to these objects heating up. Furthermore, there are also health concerns in comparison with widely distributed magnetic fields.

In order to create the local maxima, the floor covering is preferably provided with an element made of ferromagnetic material at the localized maximum of the magnetic field distribution. This element is for example formed in the manner of a bar.

In order to create the magnetic field, the parallel current conductors are also disposed in a special way in the area of an element. For instance, the element is in particular woven in between the current conductors and extends (with its main extent) in the transverse direction over a number of neighbouring current conductors.

The element may, for example, be arranged in such a way that all the conductors of a first current direction run underneath the element, while all the conductors of a second, opposite current direction run above the element (vertical separation). Alternatively, it is possible to separate the conductors in the area of an element according to the current direction in the transverse direction and dispose them in the areas at the ends of the element (horizontal separation).

A number of spaced-apart elements made of ferromagnetic material are advantageously arranged on the floor covering, and a number of localized maxima are created. This makes it possible for electrical energy to be picked up at different locations of the floor covering. Nevertheless, the magnetic field in the remaining regions can be kept small.

In order to intensify the magnetic field, at least one current conductor may form at least one loop or winding around the ferromagnetic element.

Depending on the intended application and desired field distribution, the topology of the current conductors may be varied in many ways, for instance all the current conductors of the floor covering may be connected in series, and consequently form a single circuit, or a number of parallel, and optionally individually switchable, circuits are provided. As a result, individual control of the loads is made possible and improved protection in the event of faults is achieved.

The inductive coupling device advantageously comprises at least one winding for the inductive coupling with the current conductors, with preference at least one coil with a multiplicity of windings is provided. The winding or coil is positioned with respect to the current conductors in such a way that they are flowed through by the magnetic flux produced by the (primary) current in the current conductors and so a (secondary) current is induced in the winding or coil. In order that energy transmission with the least possible loss is possible, the primary current is advantageously an AC current with a frequency of 200 Hz to 2 MHz, with preference about 10-50 kHz, and the winding of the coupling device is preferably part of an oscillating circuit, the resonant frequency of which coincides with the frequency of the primary current. The current intensity in the current conductor is typically 1-25 A, the voltage 10-80 V. To improve the inductive transmission, a coil with a ferrite core may be used in the coupling device.

In order that an energy transmission is possible independently of the exact positioning of the coupling device on the floor covering, the coupling device advantageously comprises a number of spatially distributed windings, which can be connected together as required. The energy that can be picked up by means of a winding (or a coil with a number of windings lying one above the other) depends on the relative position of the winding in relation to the current conductors. In certain positions, no energy or only a small amount of energy can be transmitted, because the magnetic flux produced within the windings by the current conductors involved cancels itself out to (almost) zero. If a number of suitably spatially distributed windings are provided, a current is always induced in at least one of the windings. The coupling device then has a control unit which connects the various windings (or the various coils) suitably together, so that a maximum current is available. For example, the current produced in each winding (or coil) is individually measured, and subsequently all the windings (or coils) with currents of a first direction are connected in parallel, while the remaining windings (or coils) with currents of the opposite direction are connected in antiparallel thereto. Depending on the primary currents and voltages that are used and the desired secondary currents and voltages, a series connection may also be chosen.

In the case of a simpler solution, only a single winding or coil is present and the coupling device is aligned appropriately in relation to the current conductors in the floor covering. For this purpose, markings that correspond to one another are provided on the coupling device and on the floor covering, or the coupling device has an indicating device for correct alignment, for example an LED lamp which lights up when the positioning is correct.

In order that the loads connected to the coupling device or containing the latter can be suitably supplied with power, the coupling device comprises further components (for example transformers, switches, rectifiers and/or inverters, DSPs, etc.) for current regulation, in order to transform the secondary currents obtained into a desired useful current. Corresponding components and circuits are known per se from the prior art.

Instead of an inductive pickup of the current from the current conductors, a direct, conducting contact also comes into consideration. For this purpose, the coupling device comprises in particular contact clamps, in particular insulation piercing connecting devices, in order to pick up electrical energy from the current conductors. The clamps may also be formed for example as thin, needle-like elements which penetrate the pile of the carpet and contact the current conductors. The pile of the carpet is not damaged by the thin needle-like elements.

In order that the current conductors are always contacted by the contact clamps independently of the positioning of the coupling device, a matrix of such elements may be provided, the size and geometry thereof being adapted to the dimensions and the spacings of the current conductors. Finally, a capacitive connection of the load or transmission of the energy through the electromagnetic field in which the current conductors act in a way similar to antennas only come into consideration for the transmission of low power outputs.

The contacting of the current conductors for supplying energy from the power source is advantageously performed by flat contacts which are arranged at the edge of the floor covering and have a conducting connection in relation to the current conductors. The flat contacts may for example be fastened on the underside of the floor covering and contact the current conductors from below, or they extend at least partially into the area to the side of the floor covering and contact the current conductors from the side, i.e. in the plane of the current conductors. The individual contacts may be connected to one another by flat cables known per se and end in a connection clamp to which a customary cable for supplying power can be connected.

The contacting of the floor covering may be performed on a single side, the current conductors being connected to one another on the opposite side, in the direction of the current conductors, in order to form closed circuits, or the contacting is performed on both sides. The connection of the current conductors on the other side may already be established during the production of the floor covering, or an additional connecting element is used, it once again being possible for example for this element to be fastened on the underside of the floor covering.

In the case of a carpet in which the warp threads comprise filling warps, binding warps and pile warps, the current conductors are advantageously woven in as filling warps. These can be entirely or partly replaced by flexible current conductors comparatively easily during the weaving operation, and they undergo less loading during the weaving operation and later use of the floor covering than the binding warp or even the pile warp. The warp threads of the filling warp are also substantially stretched out straight in the ready-woven floor covering, which simplifies the direct conducting coupling in the area of the feed (and optionally in the area of the coupling device) and improves the inductive coupling.

Instead of the filling warp, the binding warp or the weft may also be entirely or partly replaced by current-conducting, flexible material.

Each current conductor advantageously has a sheathing insulating layer, for example a layer of insulating lacquer or plastic or a sheathing. This prevents the conductors from being mistakenly contacted by the surface of the floor covering and avoids short-circuits in the case of a floor covering that is damp or soaked. In order to contact the conductors directly in a conducting manner, the insulating layer is partly removed in a corresponding area (for example at the feed), or it is pierced (for example in the case of contacting by means of a needle-like element). The insulating layer has no significant adverse effect on the inductive contacting.

The insulating layer may be additionally formed in such a way that, within the weaving process, it protects the conductor surrounded by it from being damaged. Suitable materials for this purpose are PTFE (Teflon) or plastics such as polypropylene, polycarbonate or polyester.

Alternatively, for example if the pile of the carpet is very deep and/or dense and allowance does not have to be made for soaking of the floor covering, it is possible to dispense with the insulation.

The current conductors are preferably formed as metal stranded conductors, in particular copper stranded conductors, i.e. they comprise a plurality of thin individual wires. Stranded conductors, in particular copper stranded conductors, have good conductivity, are durable and very flexible, can consequently be easily processed in the weaving process and do not additionally restrict the deformability of the floor covering.

Instead of stranded conductors, it is also possible to use customary wires, the flexibility of which is adapted to the weaving process and the desired deformability of the floor covering.

The spacing between two neighbouring current conductors is in each case advantageously 0.5-2 cm. As a result, adequate energy transmission can be ensured even in the case of compact coupling devices. Neighbouring wires are also adequately far away from one another to allow instances in which they adversely influence one another to be avoided.

The arrangement for supplying power according to the invention has a wide application area. For instance, devices such as standard lamps, power supplies and lighting means of free-standing fitting elements, computers, display panels etc. can be supplied with power in a simple manner. The arrangement can also be used in particular in exhibition halls, where the fittings and fixtures are regularly disassembled and reassembled and consequently power loads have to be positioned at different locations. A further area of use arises in the transport sector, where the arrangement according to the invention can be used for example in the interior of aircraft, railway carriages, buses or ships. By means of the floor covering according to the invention, it is made possible in a simple way for power to be supplied to loads at different locations of the interior.

A specific application for the arrangement with locally created field maxima is for example that of supplying power to devices for inflating air cushions of aircraft seats (see WO 2004/009399 and WO 2004/009400, Prospective Concepts).

A lighting element that can be used in an arrangement according to the invention comprises for example
a) a coupling device for picking up electrical energy from the current conductors in the floor covering when the coupling device is brought into a power pick-up area of the floor covering;
b) an electronic transducer unit, electrically connected to the coupling device, for producing a useful current from the electrical energy picked up;
c) a light source, in particular an LED, electrically connected to the transducer unit.

These lighting elements may be used for example in prefabricated receptacles of the floor covering in which the current-carrying conductors are substantially directly accessible and which offer space for receiving a housing of the lighting element, so that the lighting elements do not protrude, or only slightly, above the surface of the floor covering. Receptacles that are not used are closed by a covering, for example made of carpet material, leather or plastic. The receptacles may already be produced in the course of carpet manufacture, in that no pile material is processed in the corresponding areas. Alternatively, the main part of the lighting element is provided underneath the carpet, and after the weaving operation holes through which the light source can pass to the front side of the carpet are introduced into the material, for example by punching.

The arrangement is likewise suitable for supplying power to mobile loads (for example vehicles or autonomous appliances such as vacuum cleaners) which move on the textile floor covering. For instance, a storage battery of such a mobile load can be charged with power which is inductively picked up by the current conductors through the coupling device and transported further to the charging device. The charging operation can always be performed when the vehicle is at a standstill, independently of its position. With suitable design of the coupling device, the charging can also be performed while it is travelling, or the drive of the mobile load is fed directly (inductively) from the floor covering. A specific application of the arrangement according to the invention is that of supplying power to electrically driven vehicles for transporting passengers or goods, such as in spacious buildings, (for example airports) with a textile floor covering. Because the vehicles do not have to be periodically returned to the charging station, but instead all the standstill times can be used for charging the storage batteries, the availability of the vehicles is greatly increased. The transporting operations that arise can consequently be performed with a smaller number of vehicles.

With suitable dimensioning and appropriately chosen currents, the current conductors integrated in the floor covering according to the invention can also be used for heating the floor. Furthermore, they can also be used (or be used exclusively) for data transmission, in particular the connected loads may be controlled by means of data information superposed on the useful current. Instead of being superposed, the data may be transmitted in separate lines that are integrated in the floor covering.

Further advantageous embodiments and combinations of features of the invention emerge from the following detailed description and the patent claims in their entirety.

BRIEF DESCRIPTION OF THE DRAWINGS

In the drawings used for explaining the exemplary embodiment.

In the figures, the same parts are in principle provided with the same reference numerals.

WAYS OF IMPLEMENTING THE INVENTION

FIGS. 1A-E are schematic representations of various ways of realizing a textile woven floor covering $1a \ldots 1e$ according to the invention. The floor covering 1 (carpet) respectively comprises a (longitudinally running) warp system with filling warp 2, binding warp $3a \ldots 3e$ and pile warp 4 and also a (transversely running) weft system with the weft 5. The current conductors $6a \ldots 6e$ are integrated in the woven fabric. The exemplary embodiments represented are made up as follows:

| Figure | Tie thread (path followed by the binding warp) | Conducting material (copper stranded conductor) | Spacing between current conductors |
|---|---|---|---|
| 1A | 1:1 | Filling warp | 3 warps |
| 1B | 2:2 | Filling warp | 3 warps |
| 1C | 1:1 | binding warp | 3 warps |
| 1D | 2:2 | binding warp | 3 warps |
| 1E | 1:1 | weft | 3 wefts |

The current conductors 6 can consequently be incorporated in the textile floor covering 1 during the weaving operation as part of the filling warp 2, the binding warp 3 or the weft 5. For this purpose, the corresponding warp or weft threads are replaced by insulated copper stranded conductors as current conductors 6. The number of warp threads is for example 320/m; in the case of the exemplary embodiments represented, the spacing between neighbouring parallel current conductors 6 is consequently approximately 1 cm.

If the current conductors 6 are part of the warp system, the conducting material can be incorporated in the warps during the weaving operation either on the respective warp beam with the other filling or binding warps or fitted on separately.

Figure 1A:
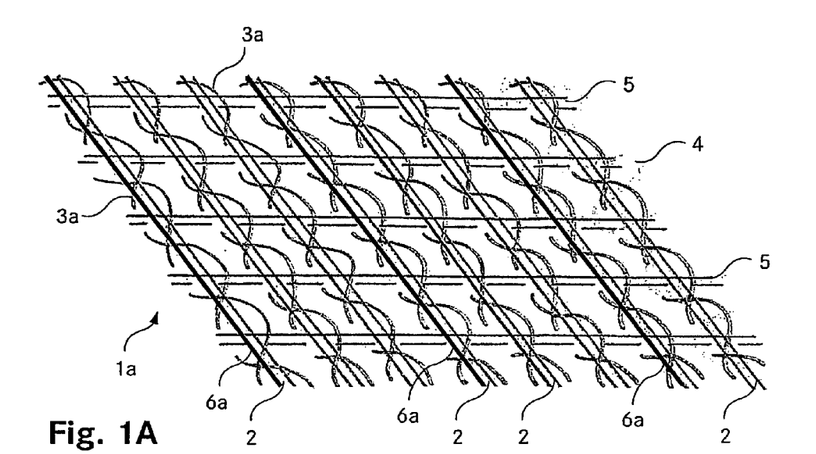
FIGS. 1A-E show schematic representations of various ways of realizing a floor covering according to the invention.
Figure 1B:
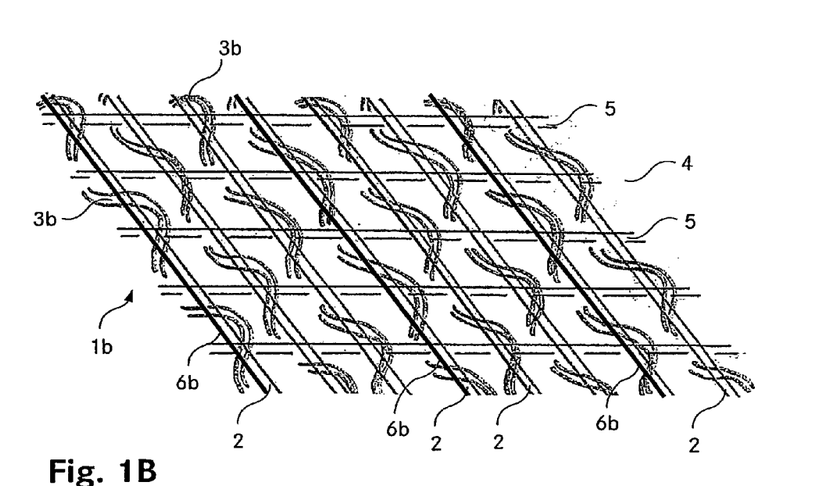
Figure 1C:
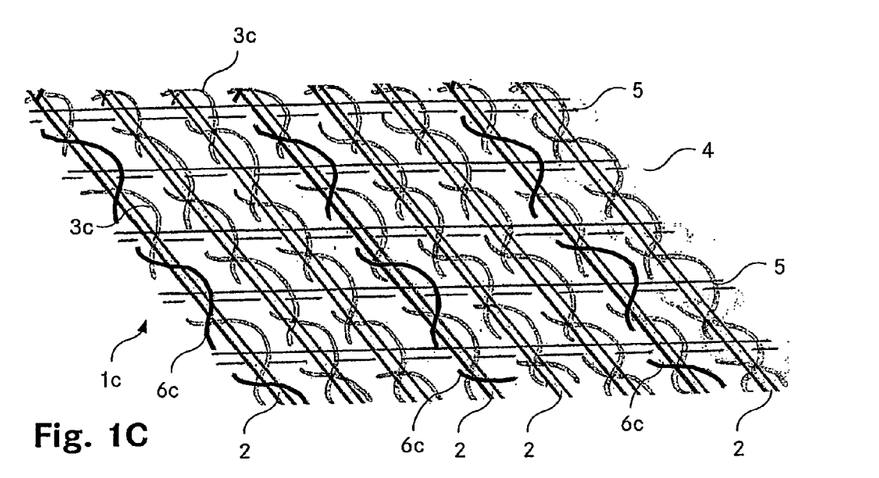
Figure 1D:
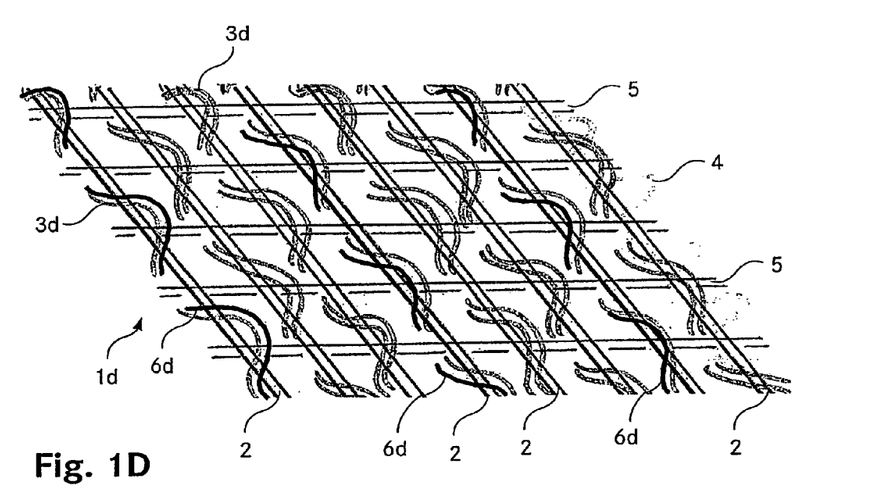
Figure 1E:
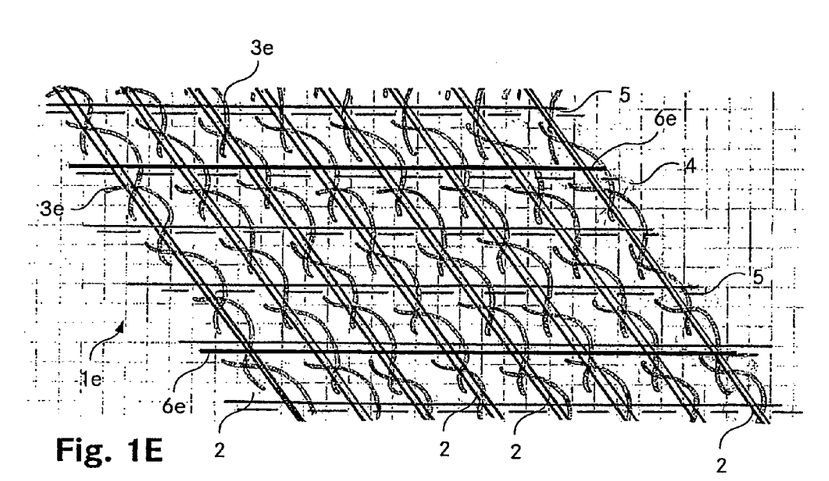

Particularly advantageous are the embodiments according to FIGS. 1A, 1B, in which the conducting material forms part of the filling warp 2. This can be incorporated particularly easily into the woven fabric in the course of the weaving operation, and in the ready-woven carpet is substantially stretched out straight, which minimizes the mechanical loading on the current conductors and allows optimum electrical properties.

The cross section of the copper stranded conductor and the spacing between the woven-in current conductors can be adapted to the parameters of the carpet (cross section of the woven threads, setting of the threads, etc.) and to the amount of energy to be transported. Instead of copper, stranded conductors made of some other material, or comprising flexible wires, may also be used.

The invention is not restricted to the ways of realizing the floor covering that are presented by way of example. The number and configuration of the warp and weft systems and the materials for the warp and weft threads (in particular for the pile warp) can be varied within a wide range, as known per se in the area of carpet manufacture. Instead of the boucle fabric shown, the invention can also be realized in the same way in the case of cut-pile or flat carpets.

Figure 2A:
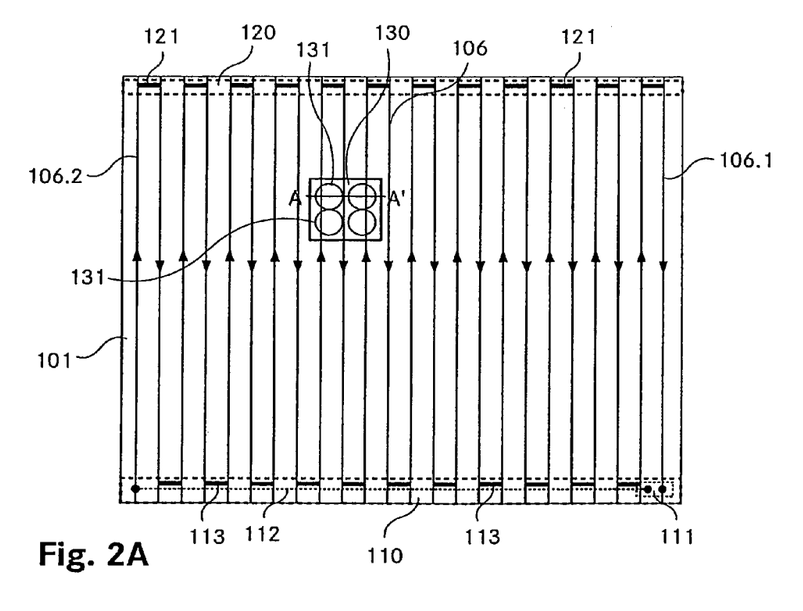
FIGS. 2A,B show schematic representations of various arrangements according to the invention for supplying power, with a first conductor topology.
Figure 2B:
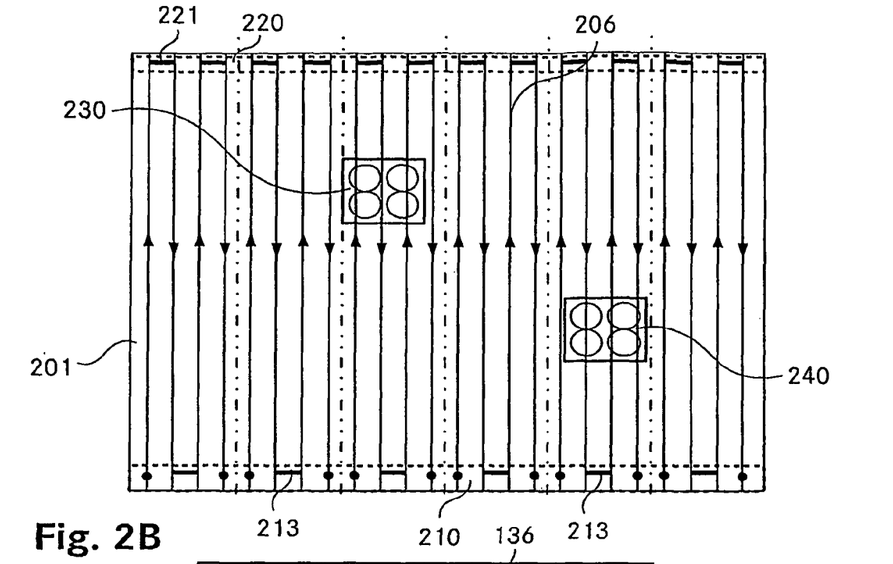

FIGS. 2A, 2B are schematic representations of various arrangements for supplying power according to the invention with a first conductor topology. FIG. 2A shows a floor covering 101 according to one of FIGS. 1A-1E, with a series of parallel running current conductors 106. Arranged at one longitudinal edge, on the underside of the floor covering 101, is a feed 110, which extends transversely in relation to the current conductors 106. The feed 110 comprises a connection terminal 111 with two connection clamps. One of the connection clamps establishes a direct contact with the outermost current conductor 106.1 at the right-hand edge of the floor covering 101, the other is connected in a conducting manner to the outermost current conductor 106.2 at the left-hand edge of the floor covering 101 by means of a connecting line 112. The feed 110 further comprises a number of connecting webs 113, which respectively connect two neighbouring current conductors 106 in a conducting manner. The connecting webs 113 are arranged in such a way that, counting from the outside, the current conductors 2/3, 4/5, 6/7, 8/9, etc. are connected to one another in a conducting manner.

On the longitudinal side opposite from the feed 110, a connecting element 120 is arranged on the underside of the floor covering 101. This element likewise extends over the entire width of the floor covering 101 and comprises connecting webs 121, which likewise respectively connect two neighbouring current conductors 106 in a conducting manner. The connecting webs 121 are arranged in such a way that, counting from the outside, the current conductors 1/2, 3/4, 5/6, 7/8 are connected to one another.

Consequently, a single circuit is formed in the floor covering 101, leading from the first connection clamp of the connection terminal 111 via all the current conductors 106 in the floor covering 101 and the connecting line 112 to the second connection clamp.

An AC current source, which for example produces an electric current with a frequency of 40 kHz and a voltage of 20 V, is connected to the connection clamps. To couple out electrical energy, a coupling device 130 is brought into the vicinity of the surface of the carpet (for example is placed on it). The coupling device 130 comprises a number of horizontally arranged coils 131, in which a current is induced on account of the magnetic field produced in the current conductors 106. This current is picked off, transformed and subsequently available for feeding a load (cf. below). The dimensions and spacings of the coils 131 are chosen such that, given any desired arrangement of the coupling device 130, a current is induced at least in one of the windings; in particular, the transverse and longitudinal spacings of the centres of the windings are different from the spacing of the current conductors or from an integral multiple thereof.

FIG. 2B shows a variant of the arrangement of FIG. 2A in which a number of circuits are formed in the floor covering 201. The floor covering 201 and the connecting element 220 correspond to their counterparts in FIG. 2A, i.e. the neighbouring current conductors 1/2, 3/4, 5/6, 7/8 are once again connected to one another by connecting webs 221. The arrangement according to FIG. 2B differs, however, from the first embodiment by a different feed 210. This comprises a number of connection clamps for circuits that are independent from one another and, counted from the outside, allow direct contacting of the current conductors 1, 4, 5, 8, 9, 12, 13, etc., and also connecting webs 213, which connect the current conductors 2/3, 6/7, 10/11, etc. to one another. Consequently, a number of individually feedable circuits each with four longitudinally running current conductors 206 are formed. In FIG. 2B, two coupling devices 230, 240, which are identical to the coupling device according to FIG. 2A, are represented. They are positioned in two spatial areas of the floor covering 201 which have circuits that are independent from each other and can consequently be separately provided with power and controlled in a simple manner.

The conductor topology can be further varied in various ways. For example, each conductor may be externally contactable individually and optionally at both ends, in order for example to transmit control data or serve as a sensor (for example of an alarm system). In this case, a feed or a contact element is provided on both sides. By contrast with the embodiments represented, the current direction may be the same for all the conductors.

Figure 3:
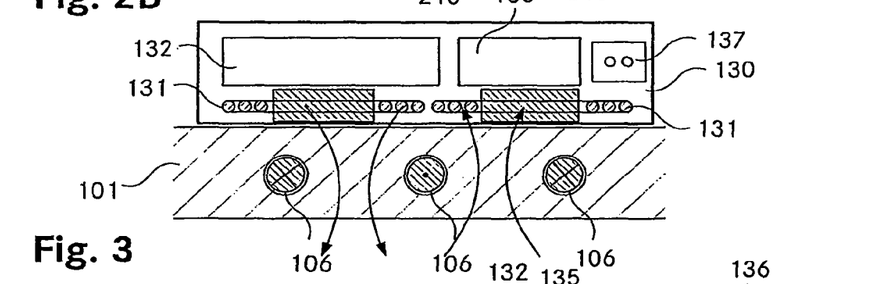
FIG. 3 shows a vertical cross section through a floor covering according to the invention and a coupling device according to the invention.

FIG. 3 shows a vertical cross section through a floor covering according to the invention and a coupling device according to the invention, along the line A-A' in FIG. 2A. Represented in the detail are three current conductors 106 running in the floor covering 101 and having insulating material, the current direction of the two outer conductors 106 being opposite to that in the middle conductor 106 on account of the chosen conductor topology.

Figure 4:
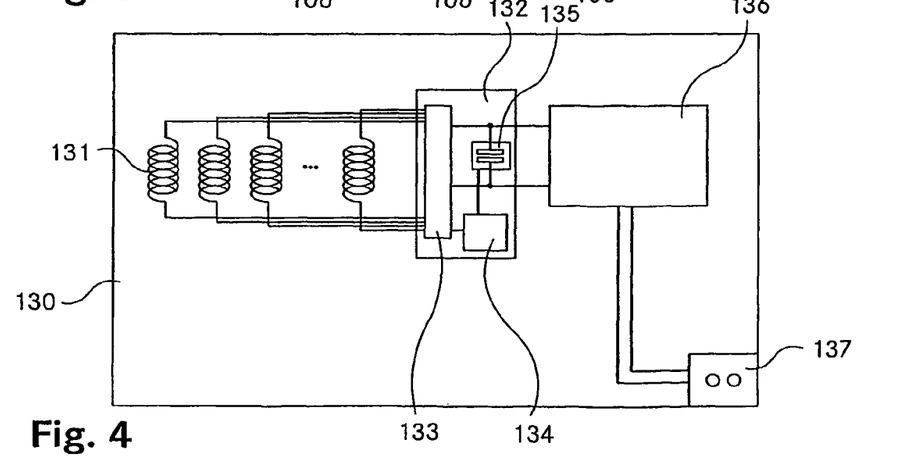
FIG. 4 shows a block diagram of a coupling device according to the invention.

On the floor covering 101 is the coupling device 130, having a number of coils 131 with a ferrite core. FIG. 4 shows a block diagram of the coupling device 130. Only the most important components are schematically represented. Further information on coupling devices can be taken for example from WO 96/02970 (Auckland Uniservices Limited).

The magnetic field produced by the current conductors 106 induces currents in the windings of the coils 131. In the example represented in FIG. 3, the coils 131 are positioned in such a way that the current directions in the two coils 131 that are shown are respectively opposed. Depending on the positioning of the coupling device 130, however, the currents may also respectively flow in the same direction. In order that the induced currents can always be structurally superposed, the coupling device 130 comprises a superposer 132 with measuring circuits and changeover switches 133, an internal control 134 and a variable capacitor 135. The latter serves for adapting the secondary oscillating circuit to the resonant frequency of the primary circuit.

The current produced is subsequently prepared in a current control unit 136 with components known per se, with regard to type of current (AC/DC), voltage and optionally frequency, and is made available at a connection terminal 137. Connected to this connection terminal 137 is a load. The coupling unit 130 may likewise be integrated directly in the load (for example a lamp, a charging device for a storage battery of a vehicle, etc.).

The internal construction of the coupling device may be adapted to the transmitted electrical power outputs, the structure of the floor covering and the intended use of the load. Instead of or in addition to the means for energy transmission, the coupling device may also have data transmission means, by means of which control data or user data can be transmitted to the load or to data terminals.

Figure 5A:
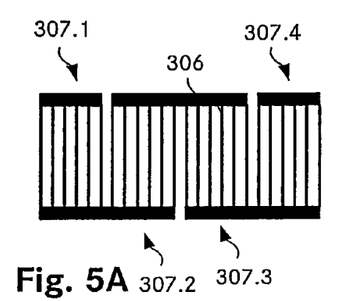
FIG. 5A shows a schematic representation of a second conductor topology of an arrangement according to the invention.

FIG. 5A is a schematic representation of a second conductor topology of an arrangement according to the invention. To increase the current flow, a number of parallel current conductors 306 lying next to one another are respectively combined into a group 307.1 . . . 307.4 and electrically connected to one another at both longitudinal ends. The groups 307.1 . . . 307.4 are electrically connected in series, so that a W-shaped topology is obtained. The electrical properties of the arrangement were investigated on the basis of a carpet of 5 m×0.5 m in extent, on the underside 50 of which parallel wires were arranged with a spacing of 9 mm. The outermost two wires were not used, while the remaining 48 wires were combined into groups of 12 wires each and connected one behind the other, as schematically represented in FIG. 5A.

The ends of this conductor arrangement were connected to an LCL power supply suitable for the inductive power supply. This produced an AC current of 17 A with a frequency of 38.4 kHz. The inductance of the tested current conductor arrangement is 4.3 µH; to adapt to the load-circuit inductance of the power supply of 52 µH, a corresponding additional inductance was connected in series with the conductor arrangement.

Figure 5B:
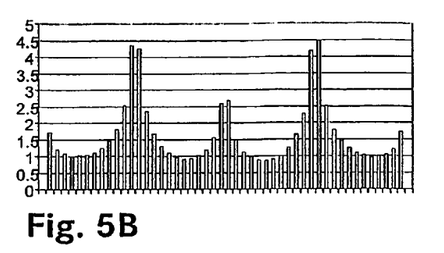
FIG. 5B shows the resultant current distribution of the second conductor topology.

FIG. 5B shows the resultant spatial current distribution of the second conductor topology, measured in amperes. It can be seen well that there are great differences between the individual conductors in the resultant current intensity. The ratio between the greatest and smallest measured current intensities is approximately 4.5. This is disadvantageous to the extent that the power loss in a conductor substantially increases with the square of the current intensity, and consequently great currents lead to heating up of the corresponding conductors and to corresponding losses of electrical energy. In addition, the coupling out of electrical energy in areas with comparatively low current intensity is possibly made more difficult or even impossible. The cause of the differences primarily lies in magnetic effects: conductors that are lying close together and through which high-frequency currents flow interact. In the present case, this interaction has the consequence that the conductors lying on the outside in the respective conductor group, which are in the vicinity of the conductors with opposite current flow, transport greater currents than conductors lying on the inside.

Figure 6A:
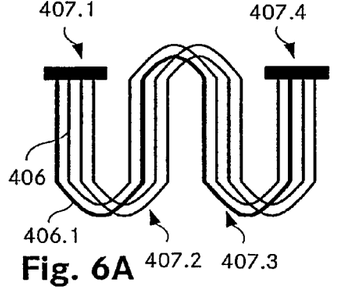
FIG. 6A shows a schematic representation of a third conductor topology of an arrangement according to the invention.

FIG. 6A is a schematic representation of a third conductor topology of an arrangement according to the invention, with which a more uniform distribution of the current intensities over the individual current conductors 406 can be achieved. The current conductors 406 are once again combined into groups 407.1 . . . 407.4 and connected together in a W-shaped topology. However, by contrast with the topology according to FIG. 5A, the current conductors 406 of a group 407.1 . . . 407.4 are only connected in parallel to one another at the beginning and end. In between, the current conductors 406 of neighbouring groups 407.1 . . . 407.4 are respectively connected individually to one another, i.e. the topology is formed between the two connecting ends by a number of W-shaped conductors that are electrically insulated from one another. In addition, the sequence of the current conductors 406 is changed over from group to group 407.1 . . . 407.4, so that the distances from the current conductors 406 that are connected to one another in series to the edge of the respective group 401.1 . . . 407.4 vary from group to group 407.1 . . . 407.4. For example, a specific current conductor 406.1 is alternately located at the outer edge of a group 407.1, 407.3 and in the inner area of a group 407.2, 407.4.

Figure 6B:
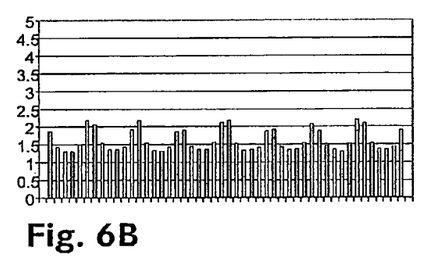
FIG. 6B shows the resultant spatial current distribution of the third conductor topology.

This compensates for the position-dependent magnetic effects in the individual W-shaped conductors and produces the substantially more uniform current distribution that is represented in FIG. 6B (once again given in amperes). The ratio between the greatest and smallest measured current intensities is now only approximately 1.7. The measurements were carried out with the same test setup as mentioned above, with only the interconnection of the individual current conductors being changed.

Skilful distribution of the current conductors to different positions within the successively following groups allows the homogeneity to be further optimized according to requirements.

Figure 7:
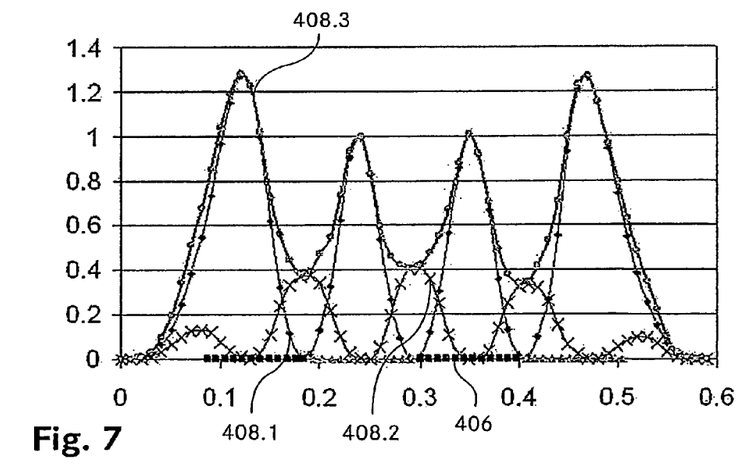
FIG. 7 shows the spatial distribution of the power output that can be coupled out in an arrangement with the third conductor topology.

FIG. 7 shows the spatial distribution of the power output that can be coupled out in an arrangement with the third conductor topology according to FIG. 6A. For this purpose, current flows induced by the horizontal and vertical components of the magnetic field produced by the current conductors 407 were measured. A flat probe of 115×40×10 mm in size (W×L×H) was used for the measurements, having two coils each with 20 windings, which were each arranged 20 mm from the respective end edge and were arranged in the end regions of the probe on the longitudinal sides. To measure the horizontal flow, the coils were connected in series; to measure the vertical flow, the second coil was connected in the reverse direction to the first coil. The electromotive force (no-load voltage) $V_{oc}$, which is proportional to the magnetic flux, was chosen as the measured value. The measuring probe was positioned at a distance of 4 mm from the surface of the carpet and moved along the carpet in steps of 10 mm.

In FIG. 7, both the uncompensated apparent power output 408.1 that can be coupled out by using the horizontal flow and the uncompensated apparent power output 408.2 that can be coupled out using the vertical flow as well as the sum 408.3 of the two are then respectively represented in the unit VA. The uncompensated apparent power output is defined as the product of the electromotive force and the short-circuit current and in the present case was calculated as $$S_u = V_{oc}^2 / X,$$

where X denotes the reactance of the coil and in the present case is 39Ω.

It is clearly evident that significantly greater power outputs can be coupled out by using the horizontal flow. However, at the minima of the horizontal flow, the vertical flow plays a part in allowing electrical energy also to be picked up from the carpet there. Using a compensated pick-up should allow an active-power output that is approximately 10 times higher to be coupled out, that is to say, in the area of the maxima of the field flux, about 13 W.

In order to use both the horizontal field flux and the vertical field flux for coupling out energy, a pick-up with a number of coils is advantageously used, either comprising both serially and oppositely interconnected coils or it being possible for the interconnection to be switched back and forth according to requirements.

Further measurements in which the vertical distance of the measuring probe from the surface of the carpet was varied have shown that usable electrical energy can be coupled out up to a height of 15 cm, the active-power output that can be coupled out decreasing however as the height increases.

Figures 8, 12:
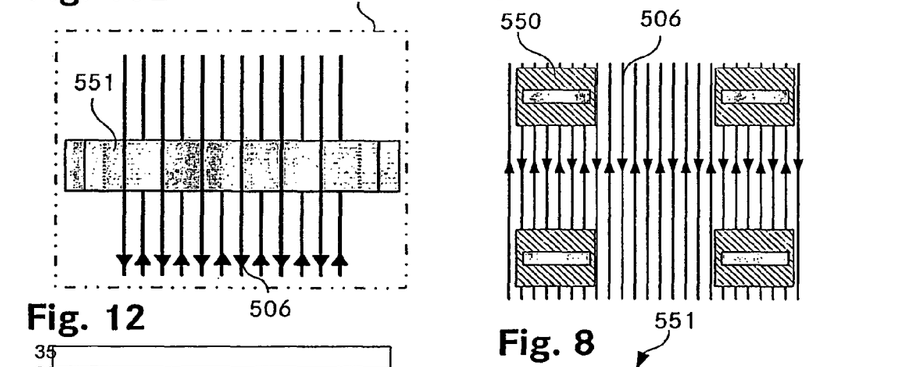
FIG. 8 shows a schematic representation of an arrangement with a conductor topology with localized coupling-out points.
FIG. 12 shows a plan view of a third conductor configuration at a local coupling-out point.

FIG. 8 is a schematic representation of a conductor topology with localized coupling-out points. The current flow in successive parallel current conductors 506 is respectively opposed—as already described above in connection with FIGS. 2A, 2B. Localized coupling-out points 550, at which electrical energy can be inductively coupled out from the current conductors, are provided at certain locations. The width of a coupling-out point 550 comprises a number of parallel current conductors 506.

Figures 9, 13:
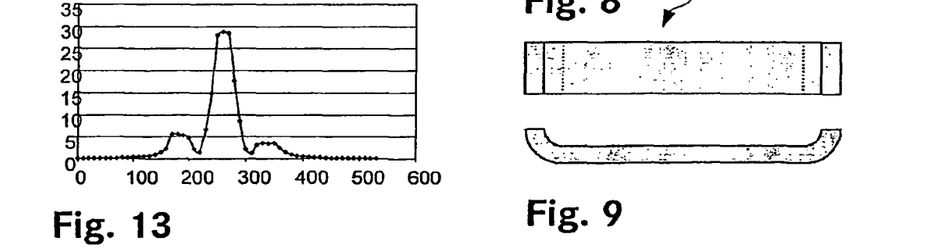
FIG. 9 shows a ferromagnetic element for the local coupling out of electrical energy from this arrangement.
FIG. 13 shows the spatial distribution of the electromotive force produced in a measuring probe in the area of a local coupling-out point.

FIG. 9 shows a ferromagnetic element for the local coupling-out of electrical energy at one of the coupling-out points represented in FIG. 8, in a plan view and a side view. The element 551 is substantially in the form of a bar with a length of 75 mm and a width of 12 mm, its longitudinal ends being slightly bent away. The thickness of the element 551 is about 4 mm. The element 551 is produced from Finemet® ($Fe_{73.5}Si_{13.5}B_9Nb_3Cu_1$) from the company Hitachi Metals Ltd., an iron-based nanocrystalline, magnetically soft material. This material has better magnetic properties than ferrite and is much more durable.

Figure 10A:
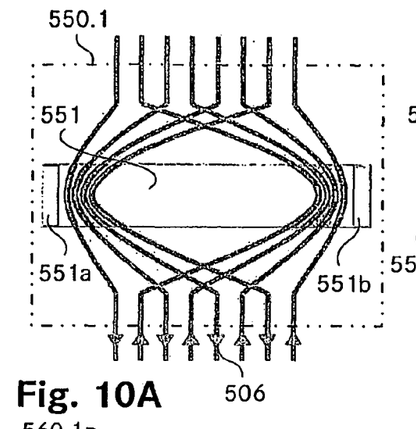
FIGS. 10A,B show a first conductor configuration at a local coupling-out point in a plan view and a vertical cross section.
Figure 10B:
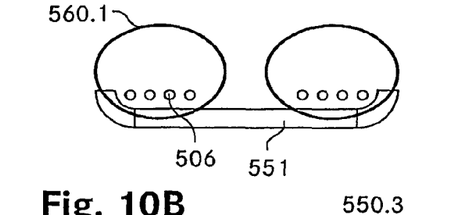

FIGS. 10A, B show a first conductor configuration at a local coupling-out point in a plan view and a vertical cross section. The coupling-out point 550.1 is formed by an element 551, which is represented in FIG. 9 and is oriented with its main extent transverse to the direction of the parallel current conductors 506 and with its main plane parallel to the plane of the current conductors 506, all the current conductors 506 running above the element 551. The current conductors 506 which run through the area of the coupling-out point 550.1 are separated according to direction in the horizontal direction (i.e. in the plane of the current conductor 506), so that in a first end area 551a of the element 551 current conductors 506 of a first current direction are grouped together, while in a second, opposite end area 551b current conductors 506 of the opposite current direction are grouped together.

In FIG. 10B, apart from the conductor configuration, the resultant magnetic field 560.1 is also outlined. Primarily the vertical field flux is usable. Measurements with the aforementioned probe and using the aforementioned power supply have shown that an apparent power output of 4.4 VA can be coupled out at a localized coupling-out point 550.1. With a compensated pick-up, active-power outputs of 15 W have been achieved.

Figure 11A:
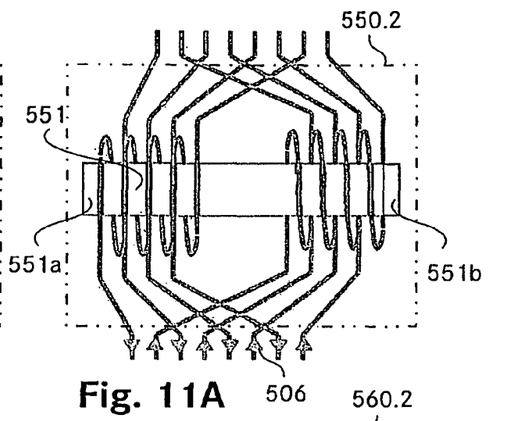
FIGS. 11A,B show a second conductor configuration at a local coupling-out point in a plan view and a vertical cross section.

FIG. 11A shows a plan view of a second conductor configuration at a local coupling-out point. The coupling-out point 550.2 is formed by an element 551, which is represented in FIG. 9 and is once again oriented with its main extent transverse to the direction of the parallel current conductors 506 and with its main plane parallel to the plane of the current conductors 506. The current conductors 506 which run through the area of the coupling-out point 550.2 are once again separated according to direction in the horizontal direction (i.e. in the plane of the current conductor 506) and additionally wound once each around the corresponding end area 551a and 551b, respectively, of the element 551. Opposite winding directions are chosen for the two groups of wires in the two end areas 551a, 551b, so that the current direction of all the current conductors above and below the element 551 is in each case parallel.

Figure 11B:
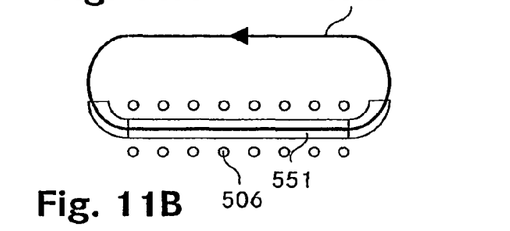

In FIG. 11B, apart from the conductor configuration, the resultant magnetic field 560.2 is also outlined. Primarily the horizontal field flux is usable. Measurements with the aforementioned probe and using the aforementioned power supply have shown that an apparent power output of 6.7 VA can be coupled out at a localized coupling-out point 550.2. With a compensated pick-up, active-power outputs of 20 W and more have been achieved.

FIG. 12 shows a plan view of a third conductor configuration at a local coupling-out point 550.3. This is once again formed by the element 551, which is represented in FIG. 9 and is oriented with its main extent transverse to the direction of the parallel current conductors 506 and with its main plane parallel to the plane of the current conductors 506. By contrast with the previous examples, the current conductors 506 which run through the area of the coupling-out point 550.3 are now separated in the vertical direction, so that the current direction of all the current conductors 506 which run above and below the element 551 is in each case parallel. This configuration is geometrically simple and can be easily realized.

The resultant magnetic field corresponds qualitatively to that outlined in FIG. 11B. Measurements have shown that an apparent power output of 1.5 VA can be coupled out. With a compensated pick-up, it would be possible to couple out an active-power output of about 6 watts.

FIG. 13 shows the electromotive force produced in the probe in the area of a local coupling-out point 550. It can be clearly seen that the magnetic flux rapidly falls and that, at a certain distance from the coupling-out point 550 (about 10 cm), the field virtually disappears. The configurations represented in FIGS. 10-12 consequently offer the advantage that virtually no inductive effects occur in areas of the floor covering without coupling-out points and that the energy can consequently be supplied to the loads dependably and specifically.

The insertion of the elements 551 in the area of the coupling-out points 550 must be prepared during the production of the carpet. For this purpose, for example, loops in the woven-in current conductor into which the elements 551 can later be inserted are created at the corresponding points. Because, in the best-possible arrangement represented, the one according to FIGS. 11A, 11B, the element 551 is entirely surrounded by windings of the current conductors, it may be advantageous to incorporate adapted substitutes during the production of the carpet, the place of which can be taken over by the elements 551 in a later operation.

The arrangement for supplying localized coupling-out points can also be used for example in the interior of an aircraft, where the magnetic field produced is to be kept as small as possible outside these coupling-out points. The arrangement described allows, for example, power to be supplied to electric pumps for inflating air cushions of aircraft seats, but also to lighting elements or other (stationary) loads.

The layout of the current conductors and the positions of the coupling-out points can be adapted to the specific situation. For example, the current conductors do not have to be woven-in in the entire carpet, but may only be provided in spaced-apart, longitudinally running areas. The configuration of the coupling-out points can also be adapted; in the case of a configuration according to FIG. 11A, for example, each current conductor may be led a number of times around the ferromagnetic element.

Figure 14A:
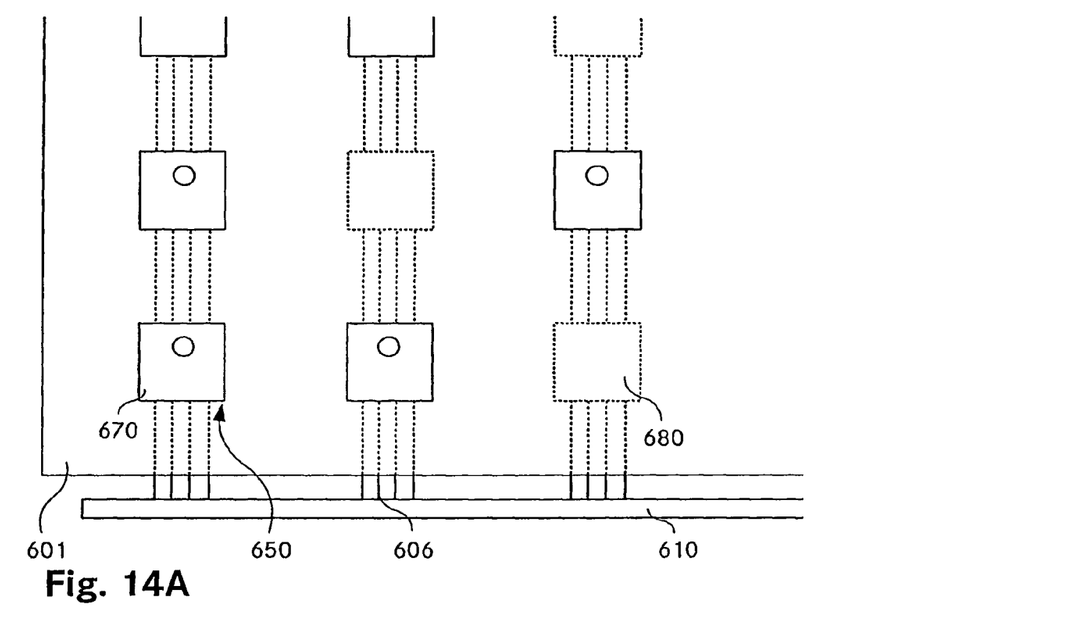
FIGS. 14A,B show a further embodiment of an arrangement according to the invention with a series of lighting elements that can be fitted into the floor covering.

FIGS. 14A, B show a further embodiment of an arrangement according to the invention with a series of lighting elements that can be inserted into the floor covering. FIG. 14A shows a plan view of a corresponding floor covering. It is once again in principle a carpet 601, as described above in connection with FIGS. 1A-E. A number of insertion points 650, into which lighting elements 670 can be inserted, are provided in the carpet 601. The size of an insertion point is only about 3×3 cm. In the area of the insertion points 650, the carpet 601 is produced without pile material, so that square clearances are formed on the upper side of the carpet 601. Unused insertion points 650 are closed by covers 680 made of carpet material and are visually scarcely perceptible any more from a certain distance. Moreover, in the final state, the current conductors 606 that are woven-in in the carpet 601 are no longer openly accessible anywhere.

Current conductors 606 are woven into the carpet 601 in such a way that each insertion point 650 is passed through by four parallel current conductors 606. On account of the missing pile material in the area of the insertion points 650, the woven-in current conductors 606 are located at the surface and can therefore be easily contacted. The current conductors 606 are supplied with power by a feed 610 arranged at the edge.

Figure 14B:
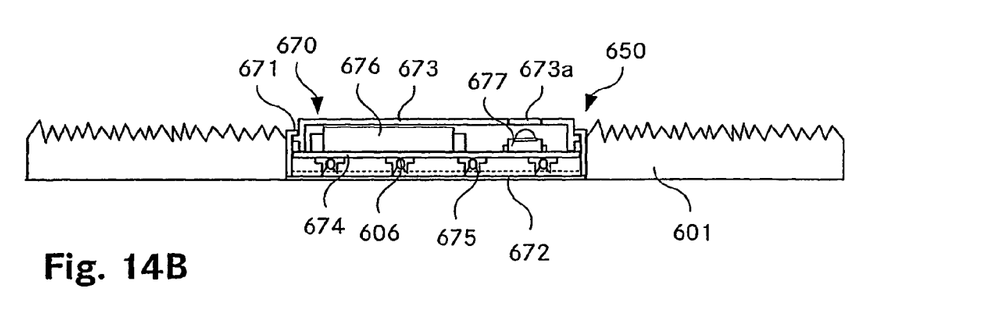

In FIG. 14B, a lighting element 670 inserted into an insertion point 650 is represented in cross section. The outer form of the lighting element 670 corresponds to the dimensions of the insertion point 650, so as to create a direct connection to the carpet 601 at the lateral edges and a continuous surface on the upper side. The lighting element 670 comprises a housing 671 made of plastic with a bottom part 672 and a covering 673 held on the latter. Accommodated in the housing 671 is a printed circuit board 674, on the underside of which four insulation piercing connecting devices 675 of low overall height are provided. Fastened on the upper side of the printed circuit board 674 are a power supply module 676 with a transformer and an LED light source 677. The LED light source 677 can be seen from the upper side of the carpet 601 through a transparent portion 673a of the covering 673.

Each of the insulation piercing connecting devices 675 contacts one of the current conductors 606 passing through the insertion point 650. For this purpose, the insulation piercing connecting devices 675 protrude so far beyond the underside of the lighting element 670 that the exposed current conductors 606 are contacted by the tips of the insulation piercing connecting devices 675. The tips are formed in such a way that, at the contact point with the current conductor 606, they pierce (or cut) through the insulation that is present and consequently create a conducting contact directly. The entry area of the tip is conically tapered, so that the current conductors 606 can be received by the insulation piercing connecting device 675 even if they are offset slightly from an ideal position in the lateral direction.

The insulating piercing connecting devices 675 are connected to the power supply module 676, the current conductors 606 being connected in such a way that a number of lighting elements 670 that are arranged in the same line are connected in parallel with one another. Moreover, with each lighting element 670, two current conductors 606 are contacted in parallel for each polarity, so that the currents in the individual current conductors 607, and consequently the heating up of the current conductors 606 and the accompanying losses, can be reduced. The power supply module 676 transforms the picked-up energy in a way known per se such that the LED light source 677 can be fed.

In addition, the power supply module 676 also undertakes control functions, therefore switches the LEDs on and off, optionally controls the brightness and/or the colour of the light. The arrangement may be formed in such a way that, within the capabilities of the LED light sources 677, the light spots in the carpet 601 can be activated as desired with regard to brightness and colour by a computer. The control information can be transmitted through the current conductors 606, in that said information is for example superposed on the supply voltage. There are also other transmission possibilities, for example by separate data conductors woven into the carpet or by wireless transmission techniques. In the simplest case, the LED light sources 677 are controlled by applying the voltage to the current conductors 606, all the lighting elements 670 of a line respectively lighting up or remaining dark.

To sum up, it can be stated that an arrangement for supplying a load with electrical energy that allows a high degree of flexibility and can be integrated well in rooms is created by the invention.

The invention claimed is:

1. Arrangement for supplying a load with electrical energy from a power source, comprising a) a textile, woven floor covering with longitudinally running warp threads and transversely running weft threads, three or more current conductors that are spaced apart and substantially parallel to one another being woven in either as warp threads or as weft threads;
b) a feed for the connection of the current conductors to the power source; and
c) a coupling device for picking up electrical energy from the current conductors in the floor covering and transporting it further to the load when the coupling device is brought into a power pick-up area of the floor covering.

2. Arrangement according to claim 1, wherein the coupling device is formed in such a way that electrical energy can be inductively picked up from the current conductors.

3. Arrangement according to claim 2, wherein the three or more current conductors form a first group, via which electrical energy is transmitted in a first direction, and a second group, via which electrical energy is transmitted in a second direction, opposite to the first direction, each group producing a magnetic field which determines the power pick-up area of the floor covering.

4. Arrangement according to claim 3, wherein the first group and the second group respectively comprise two or more current conductors.

5. Arrangement according to claim 2, wherein the feed is formed in such a way that, on connection of the current conductors to the power source, an extensive magnetic field distribution is created in the area of the connected current conductors, so that in this area an electrical power output that is required as a minimum for the load can be picked up substantially everywhere, independently of the position of the coupling device.

6. Arrangement according to claim 4, wherein in each case a number of current conductors of a group are electrically connected in parallel.

7. Arrangement according to claim 6, wherein current conductors of neighbouring groups are connected individually to one another, and in that a sequence of the current conductors is changed over between the neighbouring groups in such a way that a distance from at least one of the current conductors to a nearest outermost current conductor of the respective group varies between a first of the neighbouring groups and a second of the neighbouring groups.

8. Arrangement according to claim 2, wherein the three or more current conductors form a first group, via which electrical energy is transmitted in a first direction, and a second group, via which electrical energy is transmitted in a second direction, opposite to the first direction, neighbouring current conductors respectively belonging alternately to the first group and the second group.

9. Arrangement according to claim 2, wherein the feed is formed in such a way that, on connection of the current conductors to the power source, a magnetic field distribution with at least one localized maximum is created in the area of the connected current conductors, while the magnetic field is small in the remaining regions of this area.

10. Arrangement according to claim 9, wherein the floor covering is provided with an element made of ferromagnetic material at the at least one localized maximum of the magnetic field distribution.

11. Arrangement according to claim 10, wherein the element made of ferromagnetic material is woven in between the current conductors and extends in the transverse direction over a number of neighbouring current conductors.

12. Arrangement according to claim 11, wherein a number of spaced-apart elements made of ferromagnetic material are arranged and in that a number of localized maxima are created.

13. Arrangement according to claim 10, wherein at least one current conductor forms at least one loop or winding around the ferromagnetic element.

14. Arrangement according to claim 2, wherein the coupling device comprises at least one winding for the inductive coupling with the current conductors.

15. Arrangement according to claim 14, wherein a number of spatially distributed windings, which can be connected together as required, are provided.

16. Arrangement according to claim 1, wherein the coupling device comprises contact clamps, in order to pick up electrical energy from the current conductors.

17. Arrangement according to claim 1, wherein the feed comprises flat contacts arranged at an edge of the floor covering for contacting the current conductors in a conducting manner.

18. Lighting element for an arrangement according to claim 17, comprising
a) a coupling device for picking up electrical energy from the current conductors in the floor covering when the coupling device is brought into a power pick-up area of the floor covering;
b) an electronic transducer unit, electrically connected to the coupling device, for producing a useful current from the electrical energy picked up;
c) a light source, electrically connected to the transducer unit.

19. Textile, woven carpet, in particular for an arrangement according to claim 1, with longitudinally running warp threads and transversely running weft threads, wherein three or more current conductors that are spaced apart and substantially parallel to one another are woven in either as warp threads or as weft threads the current conductors replacing part of a filling warp, a binding warp or the weft threads during the weaving operation.

20. Floor covering according to claim 19, wherein the warp threads comprise filling warps, binding warps and pile warps, the current conductors being woven in as filling warps.

21. Floor covering according to claim 19, wherein each current conductor has a sheathing insulating layer.

22. Floor covering according to claim 19, wherein the current conductors are formed as metal stranded conductors.

23. Floor covering according to claim 19, wherein the spacing between two neighbouring current conductors is 0.5-2 cm.

* * * * *